United States Patent Office 2,946,770
Patented July 26, 1960

2,946,770

POLYMERIZATION OF VINYLIDENE COMPOUNDS USING ORGANIC PEROXIDE, ORGANIC SULFUR AND QUATERNARY AMMONIUM COMPOUNDS AS CATALYSTS

Erich Bäder, Hanau am Main, Otto Schweitzer, Konigstein, Taunus, and Wilhelm Querfurth, Oberursel, Taunus, Germany, assignors to Deutsche Gold- und Silber-Scheideanstalt vormals Roessler, Frankfurt am Main, Germany No Drawing. Filed July 25, 1955, Ser. No. 524,272

Claims priority, application Germany July 30, 1954

5 Claims. (Cl. 260—77.5)

This invention relates to a process for the polymerisation of organic compounds.

It is known to polymerise organic compounds having terminal or intermediate carbon to carbon double bonds. These compounds include, for example, styrene and its derivatives, acrylic and methacrylic acids and esters thereof, vinyl compounds, acrylonitrile, butadiene, chlorbutadiene and dimethylbutadiene, alone or in admixture with one another. These compounds can be polymerised in solution or emulsion or in bulk. For many purposes it is advantageous to polymerise a system which consists of a solution or suspension of a high-molecular weight substance in a polymerisable monomeric substance. Such mixtures can, for example, be employed with good results for dental purposes.

Redox systems have been proposed as catalysts for the polymerisation of these substances, which systems contain on the one hand oxygen, such for example as atmospheric oxygen, but preferably oxygen in peroxide form, such for example as benzoyl peroxide. Sulphinic acids or salts thereof, alpha-hydroxysulphones or salts thereof, sulphoxyl compounds, such as sodium formaldehyde sulphoxylate obtained by reacting sodium hydrosulphite with formaldehyde or the corresponding zinc, calcium or bismuth salts, alpha-amino-sulphones, especially of secondary or tertiary amines, and mercaptans, have been proposed as the reducing components of such Redox systems.

It has now been found that the polymerisation of such systems can be considerably accelerated and improved if organic onium compounds are employed as polymerisation accelerators. As examples of these compounds which are known per se there may be mentioned phosphonium, arsonium or stibonium compounds or the corresponding compounds of mercury, zinc, bismuth, tin or lead.

Organic ammonium, sulphonium or oxonium compounds of the general formulae:

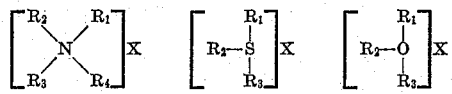

in which $R_1$, $R_2$, $R_3$ and $R_4$ represent the same or different organic radicals, which are directly linked by one carbon atom to the nitrogen, sulphur or oxygen atom, and X represents an acid residue or the hydroxyl group, have proved particularly effective.

Of the above compounds the salts of quaternary ammonium bases are the most readily accessible and particularly effective.

It has further been found that the activity of these polymerisation accelerators can be further improved by adding to them small quantities of heavy metal compounds, such for example as copper or iron compounds, and/or small quantities of monohydric or polyhydric aliphatic alcohols, such for example as methanol, ethanol or glycol.

For many purposes it has proved advantageous to add to the mixture organic or inorganic acids, such as acrylic acid, methacrylic acid or phosphoric acid, in such quantities that any free bases present are neutralised.

Finally, it has proved advantageous in many cases not to keep the polymerisation mixture wholly water-free but to arrange for the presence of small quantities of water.

Table I below summarises the results of experiments with mixtures in accordance with the invention. In each experiment a mixture of 1.3 g. of polymeric methyl methacrylate with 0.75 ml. of monomeric methyl methacrylate was polymerised with the addition of the substances mentioned in the table at an initial temperature of 22 to 23° C. and the time required to reach the maximum temperature was recorded.

The results of a further series of experiments are set out in Table II.

TABLE I

| Quaternary compounds | S-containing initiator | Peroxide | Further additions | | | Polymerisation time, Minutes. |
|---|---|---|---|---|---|---|
| 1. 0.5% Triethyl-benzyl-ammonium chloride. | 2% Toluene-sulphinic acid | | 2% Methanol | 10γ Cu++ (as acetylacetonate). | | 8. |
| 2. 0.5% Octadecyl-di-methyl-benzyl-amonium chloride. | 2% Na-toluene-sulphinate | | do | 10γ Cu++ | 5% Methacrylic acid. | 11. |
| 3. 0.5% Octadecyl-di-methyl-benzyl-amonium chloride. | do | | do | 10γ Cu++ | 0.5% $H_3PO_4$ | 11.5. |
| 4. 0.5% Dodecyl-dibenzyl-methyl-ammonium chloride. | do | 1% benzoyl peroxide. | do | 10γ Cu++ | 3% Methacrylic acid. | 11.5. |
| 5. 0.5% Phenylethyl-dibutyl-ethyl-ammonium chloride. | 1% Ca-benzene-sulphinate | 1.5% benzoyl peroxide. | | 5γ Fe+++ (as naphthenate). | {7% Methacrylic acid 0.6% $H_3PO_4$ | }9.75. |
| 6. 0.5% Dodecyl-debenzyl-methyl amonium chloride. | 2% $CH_3C_6H_4SO_2CH_2OH$ | | 2% Methanol | 10γ Cu++ | | 7. |
| 7. 0.5% Triethyl-benzyl-ammonium chloride. | 2% $(CH_3C_6H_4SO_2CH_2)_2NC_2H_5$ | | | 10 γCu++ | | 13.5. |
| 8. 0.5% Ethanol-diethyl-benzyl-ammonium chloride. | 2% $(CH_3C_6H_4SO_2CH_2)_2NC_2H_5$ | | 2% Methanol | 10γ Cu++ | | 9. |
| 9. 0.5% Octadecyl-di-methyl-benzyl-ammoninm chloride. | 2% $(CH_3C_6H_4SO_2CH_2)_2NC_2H_5$ | | 2% 1.3-Butanediol. | 10γ Cu++ | | 9. |
| 10. 0.5% Octadecyl-di-methyl-benzyl-ammonium chloride. | 2% $(CH_3C_6H_4SO_2CH_2)_2NC_2H_4C_6H_5$ | | 2% Methanol | 10γ Cu++ | | 10. |
| 11. 0.5% Dodecyl - dibenzyl-methyl-ammonium chloride. | 1% $(CH_3C_6H_4SO_2CH_2)_2NH$ | 1% benzoyl peroxide. | do | 10γ Cu++ | | 10. |
| 12. 0.5% Dodecyl - dibenzyl-methyl ammonium chloride. | 1% Dodecylmercaptan | | do | 10γ Cu++ | 5% acrylic acid. | 11. |

TABLE I—Continued

| Quaternary compounds | S-containing initiator | Peroxide | Further additions | | | Polymerisation time, Minutes. |
|---|---|---|---|---|---|---|
| 13. 0.8% Triethyl-benzyl-amonium hydroxide. | 2% (CH₃C₆H₄SO₂CH₂)₂NC₂H₅ | | do | 10γ Cu⁺⁺ | | 13. |
| 14. 0.1% Triethyl-benzyl-ammonium hydroxide. | 2% (CH₃C₆H₄SO₂CH₂)₂NC₂H₅ | | do | 10γ Cu⁺⁺ | | 8. |
| 15. 0.5% Trimethyl-benzyl-ammonium hydroxide. | 0.8% (CH₃C₆H₄SO₂CH₂)₂NH | 0.6% dichlorbenzoyl peroxide. | 1.7% 1.2-propane-diol. | 10γ Cu⁺⁺ | | 9. |
| 16. 0.5% Triethyl-benzyl-ammonium methacrylate. | 2% (CH₃C₆H₄SO₂CH₂)₂NC₂H₅ | | 2% Methanol | 10γ Cu⁺⁺ | 1.5% Methacrylic acid. | 9. |
| 17. 0.5% Triethyl-benzyl-ammonium-p-toluene sulphonate. | 2% (CH₃C₆H₄SO₂CH₂)₂NC₂H₅ | | do | 10γ Cu⁺⁺ | 1.5% p-toluene-sulphonic acid. | 16. |
| 18. 0.5% Trimethyl-benzyl-ammonium phosphate. | 2% (CH₃C₆H₄SO₂CH₂)₂NC₂H₅ | | do | 10γ Cu⁺⁺ | | 9. |
| 19. 0.5% Trimethyl-benzyl-ammonium nitrate. | 2% (CH₃C₆H₄SO₂CH₂)₂NC₂H₅ | | do | 10γ Cu⁺⁺ | | 8. |
| 20. 0.5% Trimethyl-benzyl-ammonium sulphate. | 2% (CH₃C₆H₄SO₂CH₂)₂NC₂H₅ | | 1.7% 1.2-propane-diol. | 10γ Cu⁺⁺ | | 9.5. |
| 21. 0.5% Phenylethyl-dibutyl-methyl-ammonium sulphate. | 0.8% (CH₃C₆H₄SO₂CH₂)₂NH | 0.6% Dichlorbenzoyl peroxide. | do | 10γ Cu⁺⁺ | | 7.5. |
| 22. 0.5% Phenylethyl-dibutylmethyl-ammonium bromide. | 2% Sodium formaldehyde sulphoxylate | 0.4% benzoyl peroxide. | 2% Water | 10γ Cu⁺⁺ | 1% acrylic acid. | 6. |
| 23. 0.5% Phenylethyl-dibutylmethyl-ammonium chloride. | 2% Zinc formaldehyde sulphoxylate | 0.5% dichlorbenzoyl peroxide. | do | 10γ FeCl₃ | 2% H₃PO₄ | 8. |
| 24. | 2% (CH₃C₆H₄SO₂CH₂)₂NCH₃ | | 2% Methanol | 10γ Cu⁺⁺ | | Still soft after 15 hours. |
| 25. | 1% Dodecylmercaptan | | do | 10γ Cu⁺⁺ | 5% acrylic acid. | Do. |
| 26. 0.5% Dodecyl-di-benzylmethyl-ammonium chloride. | | | do | 10γ Cu⁺⁺ | 5% acrylic acid. | Do. |

TABLE II

| Polymerisable mixture | Quaternary compound | S-containing initiator (2%) | Peroxides | Heavy metal addition | Polymerisation time, Minutes. |
|---|---|---|---|---|---|
| 27. 65% unsatd. polyester resin +35% monostyrene | Trimethyl-benzyl-ammonium hydroxide. | (CH₃C₆H₄SO₂)₂NC₂H₅ | 1% benzoyl peroxide. 2% cumene hydroperoxide. | 5γ Cu⁺⁺/ml. (as acetylacetonate). | 11 |
| 28. 62% unsatd. polyester resin +33% monostyrene + 5% acrylic acid | Dodecyl-dibenzylmethyl-ammonium chloride. | Dodecylmercaptan | 1% benzoyl peroxide. 2% cumene hydroperoxide. | 5γ Cu⁺⁺/ml. (as acetylacetonate). | 2 |
| 29. 62% unsatd. polyester resin +33% monostyrene + 5% acrylic acid | Phenylethyl-dibutylmethyl-ammonium sulphate. | p-Toluene-sulphinic acid | 1% benzoyl peroxide. 2% cumene hydroperoxide. | 10γ Cu⁺⁺/ml. (as naphthenate). | 7 |
| 30. 95% ethyl acrylate + 5% acrylic acid | do | p-Toluene-sulphinic acid | 1% benzoyl peroxide. | 10γ Cu⁺⁺/ml. (as naphthenate). | 1 |
| 31. 95% ethyl acrylate + 5% acrylic acid | Trimethyl-benzyl-ammonium phosphate. | CH₃C₆H₄SO₂CH₂OH | 2% benzoyl peroxide. 2% cumene hydroperoxide. | 10γ Cu⁺⁺/ml. (as naphthenate). | 2 |
| 32. 75% ethyl acrylate + 5% acrylic acid | Dodecyl-dibenzyl-methyl-ammonium chloride. | (CH₃C₆H₄SO₂CH₂)₂NC₂H₅ | | 10γ Cu⁺⁺/ml. (as naphthenate). | 2.5 |
| 33. 75% monostyrene +20% maleic acid anhydride + 5% acrylic acid | do | (CH₃C₆H₄SO₂CH₂)₂NC₂H₄C₆H₅ | 2% lauroyl peroxide. 2% cumene hydroperoxide. | 10γ Cu⁺⁺/ml. (as naphthenate). | 2.5 |
| 34. 75% monostyrene +20% maleic acid anhydride + 5% acrylic acid | do | p-Toluene-sulphinic acid | 2% lauroyl peroxide. 2% cumene hydroperoxide. | 10γ Cu⁺⁺/ml. (as naphthenate). | 1.5 |
| 35. 87% diallyl-diglycol-carbonate +10% maleic acid anhydride + 3% acrylic acid | do | (CH₃C₆H₄SO₂CH₂)₂NC₂H₅ | 2% lauroyl peroxide. 2% cumene hydroperoxide. | 10γ Cu⁺⁺/ml. (as naphthenate). | 3 |
| 36. 84% diallyl-diglycol-carbonate +10% maleic acid anhydride + 6% acrylic acid | do | (CH₃C₆H₄SO₂CH₂)₂NC₂H₄C₆H₅ | 2% lauroyl peroxide. 2% cumene hydroperoxide. | 10γ Cu⁺⁺/ml. (as naphthenate). | 3 |

What we claim is:

1. A process for the mass polymerisation of a $CH_2=C<$ compound which comprises polymerising a polymerizable organic compound containing terminal $>C=CH_2$ group in the presence of catalytic amount of an organic peroxide, an organic sulphur compound selected from the group consisting of sulphinic acids and salts thereof, alpha-hydroxysulphones, sulphoxylates, alpha-amino-sulphones and mercaptans, and an organic quaternary ammonium compound the organic groups of which are selected from the group consisting of alkyl and aralkyl radicals.

2. The process of claim 1 in which said polymerization is carried out in the presence of a catalytic amount of a heavy metal polymerization accelerating compound selected from the group consisting of copper and iron salts.

3. The process of claim 1 in which said polymerization is carried out in the presence of a catalytic amount of an aliphatic alcohol.

4. The process of claim 1 in which said polymerization is carried out in the presence of a sufficient amount of an acid compound to neutralize any free base present.

5. The process of claim 1 in which said polymerization is carried out in the presence of a small quantity of water.

References Cited in the file of this patent

UNITED STATES PATENTS

| | | |
|---|---|---|
| 2,567,803 | Castan et al. | Sept. 11, 1951 |
| 2,697,700 | Uraneck et al. | Dec. 21, 1954 |
| 2,715,115 | Blanchette et al. | Aug. 9, 1955 |
| 2,744,105 | Barney | May 1, 1956 |
| 2,750,357 | Bredereck et al. | June 12, 1956 |
| 2,758,106 | Bredereck et al. | Aug. 7, 1956 |
| 2,779,751 | Bredereck et al. | Jan. 29, 1957 |

OTHER REFERENCES

Fueno et al.: Journal of Polymer Science XV, pages 594–595 (1955).